3,753,957
PROCESS FOR PREPARING AROMATIC POLY-
AMIDES BY CONDENSATION OF AN ARO-
MATIC ESTER OF AN AROMATIC AMINO
ACID
Rufus Sidney Jones, Dover, N.J., assignor to
Celanese Corporation, New York, N.Y.
No Drawing. Filed Dec. 9, 1971, Ser. No. 206,491
Int. Cl. C08g 20/00
U.S. Cl. 260—78 A                              13 Claims

ABSTRACT OF THE DISCLOSURE

High molecular weight aromatic linear polyamides of fiber-forming grade are prepared by condensation of monomeric aromatic esters of aromatic amino acid to form a solid oligomer, followed by subsequent solid state polymerization of the oligomer to produce high viscosity linear aromatic polyamide. The described process is particularly advantageous economically because of the high yield of fiber film and coating grade polymer coupled with the ability to recover the by-product for recycle to form the monomeric aromatic ester starting material.

INTRODUCTION

This invention relates to the production of aromatic polyamides and more particularly, to the production of high molecular weight, linear fiber-forming aromatic polyamides such as those formed more particularly from aminobenzoic acid to form polymers more particularly described as polyparabenzamide, polymetabenzamide, analogs and copolymers thereof.

BACKGROUND OF THE INVENTION

In recent years, considerable interest has been generated in wholly aromatic polyamides. A number of methods have been described for preparing such polymers, but in general such methods have been undesirable in one or more respects, such as in the difficulty of preparing the monomers, the production of undesirable by-products, some of which may act as polymerization inhibitors and the like.

Although it has been reported that the free amino acid, i.e. aminobenzoic acid, can be directly polymerized, relatively high temperatures are required to obtain a useful rate of reaction and at such temperatures a substantial amount of decarboxylation occurs, thereby producing amine rather than high polymer. Various other methods are known for producing such polymers, but such methods generally have serious shortcomings and are undesirable either because of their relatively low yields, the multi-step reactions involved, or the relatively high cost of reactants and/or monomeric starting materials. Such difficulties are substantially overcome by the present invention, wherein the major by-product of the reaction is readily removed and recovered and can be recycled to form the beginning ester starting material, thereby substantially improving economics as well as ease of preparation of the polymer.

THE INVENTION

In accordance with the invention, a method is provided for preparing high molecular weight wholly aromatic polyamides comprising heating a monomeric compound corresponding to the formula

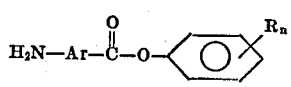

wherein Ar is selected from the group consisting of meta and para

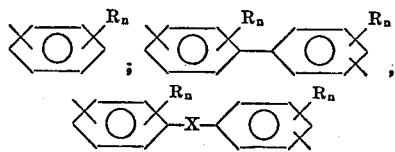

and mixtures thereof, where R is any monofunctional substitutent inert under the reactoin conditions, $n$ is an integer of 0 to 4, X is —O—,

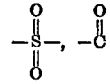

cycloalkylidene of up to 8 carbon atoms, or $CY_2$ wherein C is carbon and Y is hydrogen, mononuclear aryl or alkyl of 1 to 6 carbon atoms, said heating being at a temperature sufficient to effect reaction but below an explosive reaction rate to form an oligomer, subsequently increasing said temperature to a range of from about 300° C. to just below the polyamide decomposition temperature, thereby volatilizing monomeric by-products and continuing said heating for a time sufficient to form a product having an inherent viscosity of at least 0.4 as measured using a solution of 0.4 gram of product per 100 milliliters of concentrated aqueous sulfuric acid (97–99% by weight) at 25° C. R. is most preferably hydrogen, short chain aliphatic or alkoxy of 1 to 6 carbon atoms, halogen or phenyl.

DETAILS OF THE INVENTION

In the most preferred embodiment of the invention, the monomeric materials being polymerized first to the oligomer and subsequently to the high polymer, are phenyl-para-aminobenzoate, phenyl - meta - aminobenzoate and mixtures thereof. While the noted monomers are the most desirable reactants to form film and fiber forming polymers with certain preferred properties, variations in such properties as well as entirely different properties can be realized by using other monomeric starting compounds such as the following, all of which are within the present invention:

phenyl 3 chloro-4-aminobenzoate, phenyl 2-methoxy, 4(4-aminophenyl)benzoate, phenyl 3(3,5-dibromo-4-aminophenoxy)benzoate,

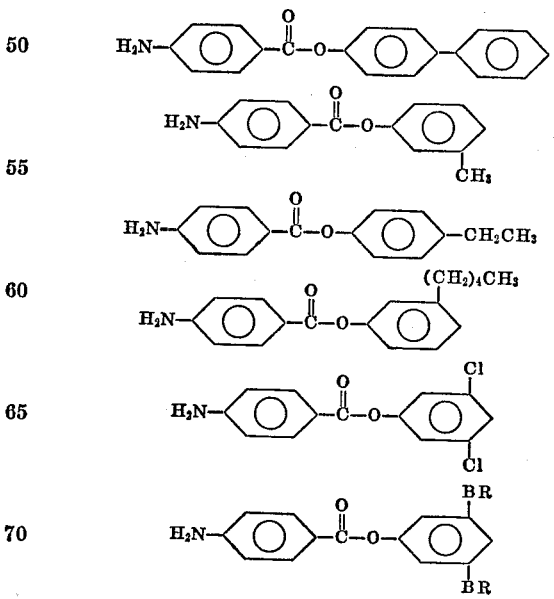

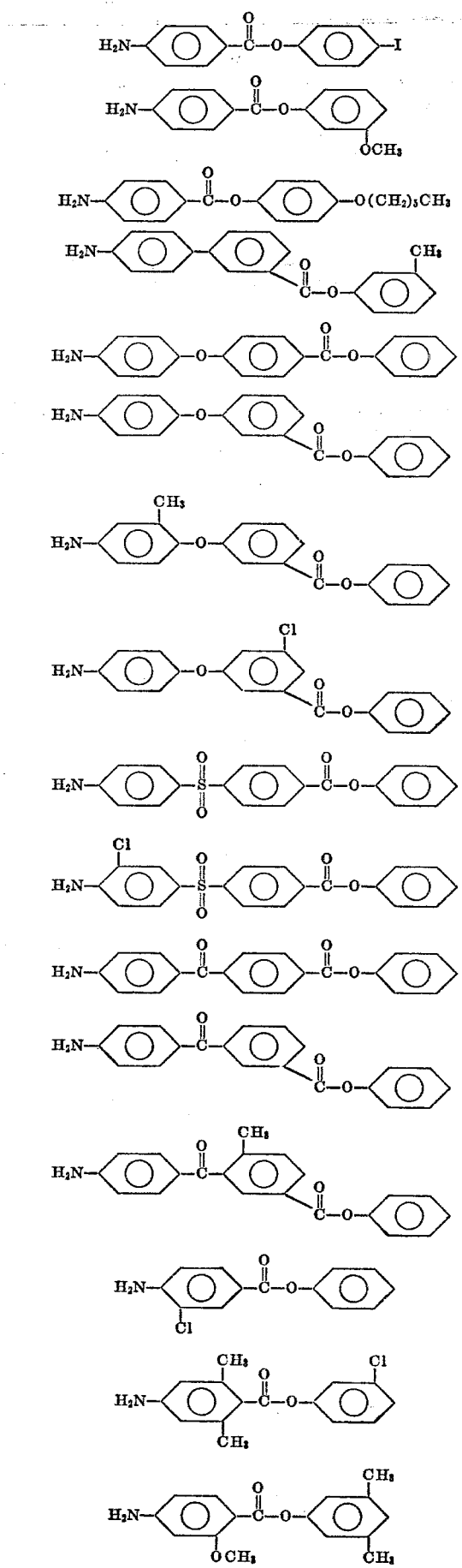
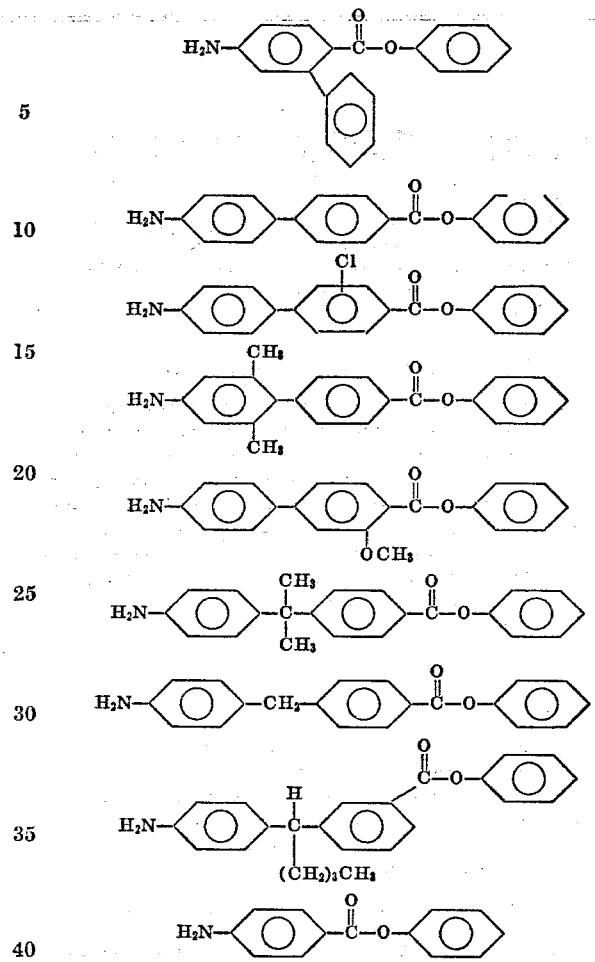

In reacting these monomeric ester starting materials, the first stage reaction in accordance with the invention, involves the splitting off of a phenol at the ester linkage coupled by amidification of the ester group by reaction with an amino group of another monomer in the reaction vessel thereby forming an amide oligomer. The phenol material is readily separated from the reaction mixture by volatilization.

For purposes of simplicity, the invention will be described hereinafter more particularly with respect to the most preferred rectants, i.e. aminobenzoic acid and derivatives. However, this is not to be interpreted as limiting the invention, as it will be recognized that variations therein as set forth herein, can be used with correspondingly good results.

The monomeric starting materials can be conveniently prepared from the corresponding nitroaromatic acid, i.e. nitrobenzoic. As such, esterification of the carboxylic acid with phenol is preferred coupled with reduction of the nitro group to form an amino group.

The phenol reacted with the aromatic acid is preferably an unsubstituted phenol, but where desired, such as in the availability of an inexpensive phenol, substituted phenols as disclosed herein can be used wherein the substituents are non-reactive under the esterification, reduction and condensation reactions. Such substituents include phenyl, lower alkyl of 1 to 6 carbon atoms and halogen, i.e. chloro, fluoro, bromo and iodo. Typical phenols include phenol, hydroxybiphenyl, o-chlorophenol, m-bromophenol, p-fluorophenol, o,p-dichlorophenol, o,m,p-tribromophenol, o-methylphenol, p-ethylphenol, o,p-dimethylphenol, o,m,p-trimethylphenol, p-butyphenol, m-hexylphenol.

It is often most desirable to begin with a fairly pure isomer or a specific purified mixture of isomers so as to ultimately form a pure polymer having the desired properties because impurities normally detract from such properties. While it is thus desirable to begin with nitro monomers of high purity, the reaction products can be conveniently purified after esterification and/or reduction of the nitro group prior to condensation. The temperature and solubility differentials between the isomers is often improved thereby permitting easy purification at a later stage at which time any additionally generated impurities can also be removed.

The phenol esterification is carried out by known methods such as reacting the acid chloride with the phenol in the presence of an acid acceptor such as pyridine.

The resulting aromatic nitrobenzoate, i.e. phenyl meta or para-nitrobenzoate is then reduced by reaction with hydrogen to form the corresponding phenyl meta or para-aminobenzoate. The reduction is preferably conducted under superatmospheric pressure utilizing a hydrogenation catalyst such as palladium or platinum, temperatures in the range of 50–70° C., and pressures of about 3 atmospheres. Any of the various hydrogenation processes as generally known in the art can be utilized in this reduction. The hydrogenation reaction is preferably carried out in a solvent for the ester such as short chain, low boiling esters or alcohols which are readily later separated by volatilization. Typically, ethyl acetate is a convenient solvent.

Upon completion of the reduction reaction, the product is preferably recrystallized to improve the purity of the starting material, which improvement is directly reflected in the ultimate properties of fibers or films produced from the resulting polymer. Where polyparabenzamide is the polymer desired, recrystallization from an alcohol such as ethyl alcohol, to recover a crystalline ester having a melting point of 171.5 to 173° C. is most desirable.

The reaction of the phenylaminobenzoate to form the oligomer proceeds rapidly under the influence of heat. No catalyst is required although such could be used if desired. At temperatures above about 345° C., the reaction proceeds violently, and therefore, it is desirable to limit the first stage of the polymerization to temperatures not greatly exceeding about 345° C. Such temperatures are best selected depending upon the reaction mass size and the ability to control the reaction. Heating is continued at such temperatures until a solid oligomer is formed. Alternatively, the reaction can be continued until the oligomer has an intrinsic viscosity about 0.1 to about 0.4, as measured in a solution of 0.4 gram oligomer per 100 milliliters of concentrated sulfuric acid at 25° C.

Inherent viscosities ($\eta_{inh}$) are determined in accordance with the following equations:

$$\eta_{inh} = \frac{\ln \eta_{rel}}{C}$$

the relative viscosity ($\eta_{rel}$) is determined by dividing the flow time in a capillary viscometer of a dilute solution of the polymer by the flow time for the pure solvent. The concentration (C) is 0.4 gram of polymer per 100 cc. of concentrated (97 to 99%) $H_2SO_4$.

The polymerization reaction is preferably carried out under a blanket of inert gas, such as nitrogen, neon, argon, krypton, and the like to thereby reduce oxidation products and degradation of the polymer. The polymerization process is conveniently carried out under atmospheric pressure. However, super and subatmospheric pressures can be utilized if desired. Subatmospheric conditions can be conveniently utilized primarily after the formation of the oligomer such as to aid in the removal of the volatile by-products from the reaction mixture.

Upon completion of the formation of the oligomer as described above, the reaction mass is polymerized to a high viscosity under solid state polymerization conditions. The reaction proceeds with increasing speed with increases in temperature over about 345° C. A very marked increase in polymerization speed is found to lie in the region between 400° C. up to the decomposition temperature, i.e. in the vicinity of about 470° C., depending upon the particular polymer. Therefore, it is particularly desirable for the fastest polymerization rates to utilize a temperature in the range of 420–470° C.

In order to facilitate the second stage of polymerization, the oligomer may be ground to a particle size small enough to permit substantially all of the particles to pass through a 20 mesh screen of the Tyler series. However, an intermediate grinding step need not be imposed primarily when the oligomer is formed in a stirred reactor which thereby produces particulated solid material.

The resulting polymer is particularly useful in the preparation of fibers, films and fibrils by wet or dry spinning and the like extruding techniques. In the spinning or shaping of the polymer into a fiber, film or like structure, it is preferable to have an inherent viscosity of at least above about 0.7 and more preferably above 1.0, as higher inherent viscosities contribute to higher fiber strength.

Polymers of the present invention can be shaped from solutions of sulfuric acid, preferably of a concentration of 95–100%, oleum, i.e. sulfuric acid containing up to 20% or higher free $SO_3$, hydrofluoric acid and other suitable strong inorganic acids, and organic solvents such as tetramethylurea, N,N-dimethylacetamide, N,N-dimethylisobutylamide, 1,3-dimethylimidazolidinone-2, N-methylpyrrolidone-2, hexamethylphosphoramide and the like.

The invention will be more fully described by reference to the examples which illustrate certain preferred embodiments of the invention. Unless otherwise indicated, all parts and percentages in the examples and claims are by weight.

EXAMPLE

Phenyl para-nitrobenzoate prepared by conventional means was dissolved in ethylacetate to form a dilute solution suitable for hydrogenation. The resulting solution is reduced with hydrogen in a stirred reaction vessel utilizing a palladium catalyst and a superatmospheric pressure of 3 atmospheres. The resulting phenyl-p-aminobenzoate was recovered by evaporation of the ethylacetate and subsequently recrystallized from ethyl alcohol to obtain a monomeric starting material having a melting point of 171.5–173° C.

The resulting purified phenyl p-aminobenzoate was then placed in a stirred reactor, the reactor evacuated and flushed with nitrogen three times and a nitrogen sweep was maintained. Heating of the reactor was commenced with the temperature being raised above the melting point of the phenyl-p-aminobenzoate to a maximum of about 325° C. Above this temperature, the reaction tended to proceed too violently. As the reaction proceeded, phenol was liberated and readily recovered. The reaction mass solidified at 325° C. after approximately 30 minutes of reaction. Measured inherent viscosities indicated the material was an oligomer having an inherent viscosity of 0.3. The continued stirring of the reactor provided a particulated solid suitable for further solid state polymerization.

The resulting particulated solid oligomer was then further heated under the noted inert atmosphere with the temperature being raised to 425° C. After 1.5 hours, the inherent viscosity of the material was 1.9.

In the same manner, phenyl m-aminobenzoate and mixtures of phenyl m- and phenyl p-aminobenzoate are polymerized to inherent viscosities above 0.4 and more preferably above 1.0. In such polymerizations the phenol portion of the starting monomer is volatilized during the reaction and readily recovered. The recovered phenol is conveniently reused in the esterification of the aromatic acid as taught herein.

While there have been described more particularly the preferred embodiments of the present invention, particularly with respect to the polymerization of polybenzamides, it will be readily recognized by those skilled in the art that the various other wholly aromatic polyamides described herein are polymerized in the same manner with correspondingly good results. As such, it is intended to cover the invention broadly being limited only by the following claims.

What is claimed is:

1. A method for preparing high molecular weight aromatic polyamides comprising heating at an elevated temperature a monomeric compound consisting essentially of materials corresponding to the formula

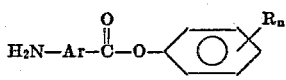

wherein Ar is selected from the group consisting of meta and para

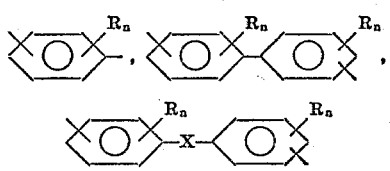

and mixtures thereof, wherein R is a monofunctional substituent inert under the reaction conditions, X is oxygen,

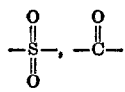

cycloalkylidene of up to 8 carbon atoms or $CY_2$ wherein C is carbon and Y is hydrogen mononuclear aryl or alkyl of 1 to 6 carbon atoms, $n$ is an integer of 0 to 4, said heating being at a temperature sufficient to effect reaction but below an explosive reaction rate to form an oligomer and subsequently increasing said temperature to a range of from about 300° C. to just below the polyamide decomposition temperature, thereby volatilizing monomeric by-products and continuing said heating for a time sufficient to form a product having an inherent viscosity of at least 0.4 as measured using a solution of 0.4 gram of product per 100 milliliters of concentrated aqueous sulfuric acid (97–99% by weight) at 25° C.

2. The method of claim 1 wherein R is hydrogen, phenyl, halogen, aliphatic or alkoxy of 1 to 6 carbon atoms.

3. The method of claim 1 wherein the monomeric compound is heated at a temperature of about 200 to 345° C. until a solid oligomer is formed.

4. The method of claim 1 wherein the heating is continued until an oligomer having an intrinsic viscosity of 0.1 to about 0.4 is formed.

5. The method of claim 1 wherein the monomeric compound is phenyl-para-aminobenzoate.

6. The method of claim 5 wherein the phenyl para-amino-benzoate is recrystallized prior to the initial reaction to provide a starting material having a melting point of 171.5 to 173° C.

7. The method of claim 1 wherein the monomeric compound is phenyl-meta-aminobenzoate.

8. The method of claim 1 wherein the monomeric compound is a mixture of phenyl meta and para-aminobenzoate 9. The method of claim 1 wherein the formed oligomer is heated at a temperature above 375° C.

10. The method of claim 9 wherein the formed oligomer is heated at a temperature of about 420 to 470° C.

11. The method of claim 9 wherein the formed oligomer is heated for a time sufficient to form a product having an inherent viscosity in excess of 1.0.

12. The method of claim 1 wherein the volatilized monomeric by-products are recovered.

13. The method of claim 1 wherein the volatilized monomeric by-products are recycled to form the beginning ester starting material.

References Cited

UNITED STATES PATENTS 2,688,011   8/1954   Wheatley et al. _____ 260—78

FOREIGN PATENTS 1,549,193   12/1968   France.

HOWARD E. SCHAIN, Primary Examiner

U.S. Cl. X.R.
260—47 CZ, 63 K